United States Patent
Abraham et al.

(10) Patent No.: US 7,612,975 B1
(45) Date of Patent: Nov. 3, 2009

(54) LIGHTNING PROTECTION

(75) Inventors: Ian Abraham, Bishops Stortford (GB); Keith Edwards, Hutton (GB); Mark Watkins, Great Dunmow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 269 days.

(21) Appl. No.: 10/979,658

(22) Filed: Oct. 14, 2004

(51) Int. Cl.
*H02H 3/22* (2006.01)

(52) U.S. Cl. ................................. 361/111
(58) Field of Classification Search ........... 361/111
See application file for complete search history.

(56) References Cited

U.S. PATENT DOCUMENTS

| | | | | |
|---|---|---|---|---|
| 4,124,822 | A * | 11/1978 | Naylor | 330/10 |
| 6,008,681 | A * | 12/1999 | Beutler et al. | 327/304 |
| 6,047,199 | A * | 4/2000 | DeMarco | 455/572 |
| 6,060,876 | A * | 5/2000 | Glasband et al. | 323/355 |
| 6,351,530 | B1 * | 2/2002 | Rahamim et al. | 379/399.01 |
| 6,972,079 | B2 * | 12/2005 | Seymour et al. | 204/298.08 |
| 7,276,814 | B2 * | 10/2007 | Pozzuoli et al. | 307/77 |
| 2003/0007103 | A1 * | 1/2003 | Roy | 348/731 |
| 2004/0130413 | A1 * | 7/2004 | Mentz et al. | 333/167 |
| 2005/0232257 | A1 * | 10/2005 | Daley et al. | 370/362 |

OTHER PUBLICATIONS

Philips Semiconductors.AN120 An overview of switched-mode power supplies. Dec. 1988.*

* cited by examiner

*Primary Examiner*—Stephen W Jackson
*Assistant Examiner*—Scott Bauer
(74) *Attorney, Agent, or Firm*—Barnes & Thornburg LLP

(57) ABSTRACT

A power supply line for powering electronic equipment from a power supply remote from the electronic equipment, having a balanced differential power transmission path 31 connecting the power supply 32 to the electronic equipment 13 and at least one isolating transformer 33, 34 in the power supply line, for providing isolation from ground potential rise associated with lightning surge currents. The invention has particular application to a wireless communications tower having the isolated power supply line for powering masthead electronic equipment 13, and an isolated communications link 21 between the masthead electronic equipment and a network terminal 22.

22 Claims, 3 Drawing Sheets

LIGHTNING PROTECTION

FIELD OF THE INVENTION

This invention relates to a lightning-protected power supply line and in particular to lightning protection of wireless communications masthead equipment.

BACKGROUND OF THE INVENTION

Damage to electrical and electronic equipment by lightning may be caused by one or more mechanisms. A direct strike may lead to potentially explosive mechanical failure. An electromagnetic pulse resultant from lightning may induce excessive voltages and currents in un-shielded conductors, including those inside integrated circuits. Wherever electronic equipment is powered remotely, a strike may lead to a ground potential rise causing a high potential difference on equipment terminals relative to a remote reference, either some distance away horizontally along the ground or between the top and bottom of a tower.

In respect of lightning strikes on a tower, the probability of a strike increases exponentially with height of location of the tower and height of the tower, ranging from tens of strikes per year on a hilltop to one or two strikes per year at sea level. Lightning strike currents range in intensity from 1-250+kA peak amplitude.

A number of measures to provide lightning protection for electronic equipment mounted on towers are presently used. Air terminals aim both to help prevent direct equipment strikes, using a "cone of protection" or "rolling sphere" concept, and to capture main strike energy when a strike occurs. Effective grounding of a tower structure channels a main current flow to earth and minimises surge currents in cables passing up and down the tower to service equipment mounted on the tower. Electromagnetic pulse shielding of sensitive equipment is provided by overall metal enclosure or use of localised metal "cans" as Faraday cages. Surge arrestor devices aim to limit voltage rise on equipment terminals and allow a large proportion of the surge current to flow between signal and ground conductors to equalise potential.

In respect of surge arrestor devices, use of voltage-activated devices is known to trip and short circuit a lightning surge to earth, for example, devices such as gas discharge tubes, metal oxide varistors the resistance of which drops above a predetermined voltage or Zener diodes. A requirement is that with lightning strikes producing currents of 1-250+kA with rapid rise and fall times, protection devices need to react quickly and to be able to handle large currents. However, although gas discharge tubes are reasonably quick and cope with short-term high currents, they have limited lifetimes dependant on a number and size of strikes. Such lightning protective devices may be rendered ineffective by a single large strike. Unless the strikes are counted and measured to predict when the protective devices need replacing, the devices have to be replaced on a conservative fixed time schedule to maintain protection. That is, the use of surge protection devices is undesirable because their high current handling capability comes at a price of a limited life so that it is necessary to replace the surge protection devices, for example field replaceable gas discharge tubes, on a regular basis depending on local lightning strike frequency. A risk remains that a level of protection provided may not be sufficient or that multiple strikes in a short period of time could destroy expensive equipment and lead to extended service outages.

An example of tower-mounted electronics equipment is wireless communications equipment mounted on a tower, although the invention is not limited to the protection of such equipment.

A low noise amplifier is typically provided at the top of a wireless communications tower, such as a cellular tower, to boost receive signals, thereby to increase cell radius. DC power is supplied to the amplifier via an up-signal coaxial cable, with a high-frequency pass filter to pass gigahertz frequency up-signals but filter out lightning frequencies which have energy concentrated below 1 MHz, that is, the cable is filtered to pass up-signals but to filter out lightning-induced currents. However, with a same cable carrying up-signals and DC supply, a simple high-pass filter cannot be used because a DC path is also needed. Instead of a simple high-pass filter, a coax parallel plate capacitor may be used with low pF capacity to pass GHz frequency signals but with a DC tap protected by gas discharge tubes and/or semiconductor protective devices on a DC lead-off. Alternatively, in-line coax protection may be provided by power supply protectors, available from, for example, PolyPhaser Technical Department, PO Box 9000, Minden, Nev. 89423-9000, incorporating metal oxide varistors. These are hybrid devices on the DC route with a capacitor blocking device.

It would be preferable to locate further active electronics equipment at a top of a mast with a power supply line but no RF path up the tower. Active electronics equipment located at the top of tower has an advantage that there is no requirement for expensive, large-diameter, low-loss coaxial cable to provide an RF path from a base to the top of the tower. Moreover, a power amplifier does not need to allow for loss in such a cable if located at the masthead.

There remains, then, a problem of providing lightning surge protection for the power line to power masthead-mounted electronics equipment without regularly replacing surge protection devices, while providing a communications link to the masthead equipment.

In summary, remote powering of electronics equipment is problematic because lightning surges produce potential differentials between opposed ends of a power supply line. Known remote powering solutions include DC bias on coaxial cables used for powering of satellite dish low noise block and masthead low noise amplifiers; pseudo square wave AC on coaxial cables, which is common practice in North American cable TV networks for powering distribution nodes; power over Ethernet DC, in which power is transmitted on spare twisted pair conductors. However, all of these are unbalanced transmissions, referenced to a local earth and are vulnerable to ground potential rise. Power over Ethernet is not a true floating power without DC/DC conversion, but instead reliance is placed on shielding and on any induced signals being well-matched and therefore not producing a damaging potential difference at the remote equipment.

SUMMARY OF THE INVENTION

According to a first aspect of the invention, there is provided a power supply line for powering electronic equipment from a power supply remote from the electronic equipment, comprising a balanced differential power transmission path connecting the power supply to the electronic equipment and at least one isolating transformer in the power supply line, for providing isolation from ground potential rise associated with lightning surge currents.

Conveniently, a first isolating transformer is located at a power supply terminal of the power transmission path and a second isolating transformer is provided at an electronic equipment terminal of the power transmission path.

In an embodiment of the invention, the at least one isolating transformer has shielding extending between input and output windings of the transformer.

Advantageously, the balanced differential power transmission path comprises at least two cables for transmitting an alternating current.

In an embodiment of the invention, the at least two cables are for transmitting an alternating current having a frequency of greater than common mains 50/60 Hz mains supplies.

Conveniently, the at least two cable are for transmitting an alternating current having a frequency in the range 360 Hz to 440 Hz.

Conveniently, the power supply line is adapted for powering masthead electronic equipment of a wireless communications tower.

In an embodiment of the invention, the wireless communications tower is further provided with an isolated communications link to the masthead electronic equipment.

Conveniently, the isolated communications link is at least one of an optical fibre link, a wireless link and an Ethernet link.

In an embodiment of the invention, the power supply line is adapted to operate at a sufficiently low voltage to allow safe installation in hazardous environments.

Alternatively, the power supply line comprises an isolated (floating) DC power supply, using a single transformer within a conventional switched mode DC-DC converter to achieve isolation.

According to a second aspect of the invention, there is provided a wireless communications tower comprising an isolated power supply line for powering masthead electronic equipment from a power supply remote from the electronic equipment, the isolated power supply line comprising a balanced differential power transmission path connecting the power supply to the electronic equipment and at least one isolating transformer in the power supply line for providing isolation from ground potential rise associated with lightning surge currents, and an isolated communications link between the masthead electronic equipment and a network terminal.

According to a third aspect of the invention, there is provided a method of powering electronic equipment over an isolated power supply line from a power supply remote from the electronic equipment for providing isolation from ground potential rise associated with lightning surge currents, comprising the steps of: providing a balanced differential power transmission path connecting the power supply to the electronic equipment; providing at least one isolating transformer in the power supply line; and supplying power from the power supply to the electronic equipment through the balanced differential power transmission path and the at least one isolating transformer.

Conveniently, the step of providing at least one isolating transformer comprises the step of providing a first isolating transformer at a power supply terminal of the power transmission path and a second isolating transformer at an electronic equipment terminal of the power transmission path.

In an embodiment of the invention, the step of providing at least one isolating transformer comprises the step of providing at least one isolating transformer with shielding extending between input and output windings of the transformer.

Advantageously, the step of providing a balanced differential power transmission path comprises providing at least two cables adapted for transmitting an alternating current.

In an embodiment of the invention, the step of providing at least two cables comprises providing at least two cables adapted for transmitting an alternating current having a frequency greater than common mains 50/60 Hz and the step of providing at least one isolating transformer comprises providing at least one isolating transformer for transmitting an alternating current having a frequency greater than common mains 50/60 Hz.

Conveniently, the method is adapted for powering masthead electronic equipment of a wireless communications tower.

In an embodiment of the invention, the method comprises a further step of providing the wireless communications tower with an isolated communications link to the masthead electronic equipment.

Conveniently, the step of providing the wireless communications tower with an isolated communications link comprises providing at least one of an optical fibre link, a wireless link and an Ethernet link.

In an embodiment of the invention, the method is adapted to operate at a sufficiently low voltage to allow safe installation in hazardous environments.

Alternatively, the step of providing a balanced differential power transmission path comprises providing an isolated (floating) DC power supply; and the step of providing at least one isolating transformer in the power supply line comprises providing a single transformer within a switched mode DC-DC converter to achieve isolation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
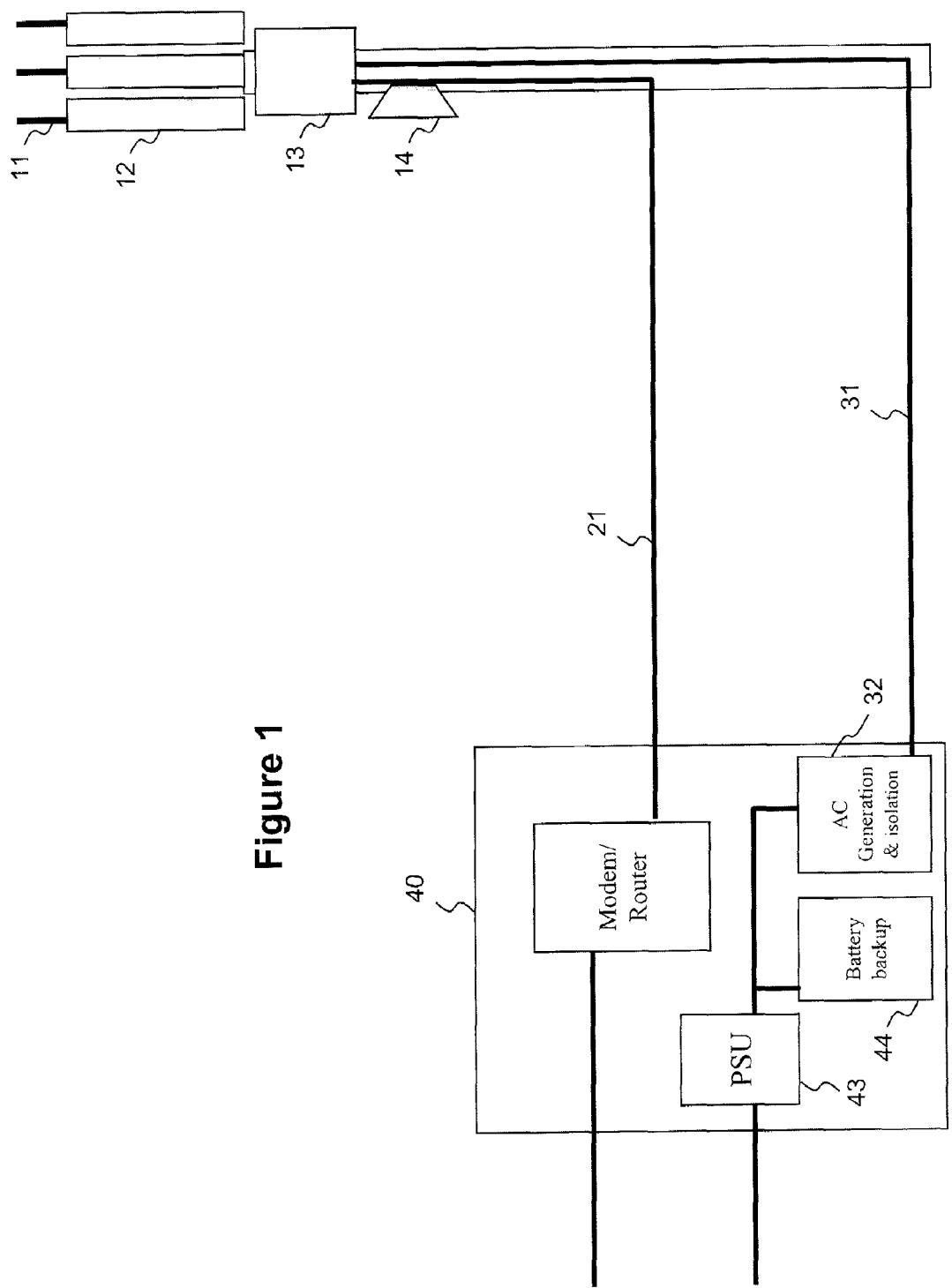
FIG. 1 is schematic diagram of a power supply line according to the invention for masthead equipment.

Throughout the description, identical reference numerals are used to identify like parts.

A Basestation Transceiver System (BTS) equipped with a lightning protection system according to the invention is shown in FIG. 1. Lightning surge protection is provided by means of known air terminals 11 protruding above antennas 12 connected to a masthead Basestation Transceiver System 13 and effective grounding as currently used, and an isolated data transmission connection 21 and isolated AC power distribution 31 according to the invention.

The isolated data transmission connection 21 may be provided by bidirectional fibre optics for data and control, for example gigabit Ethernet. Alternatively, wireless backhaul 14 may provide isolated data transmission to and from the masthead. The isolated data transmission connection 21 connects the Basestation Transceiver System 13 to a first port of a modem/router 22 located in a ground-based backhaul and power module 40. A second port of the modem/router 22 is connected to a network backhaul 221 employing, for example, T1/E1, xDSL or optical fibre.

In summary, wireless backhaul 14 provides perfect isolation for backhaul data transmission. Although, fibre optic is the natural choice for optimum cabled isolation, shielded twisted pair Ethernet (Cat 5) may provide sufficient isolation, the choice of a backhaul data transmission medium being installation dependent.

The isolated AC power distribution 31, which preferably operates at a sufficiently low voltage to allow safe installation in hazardous environments, connects the Basestation Transceiver System 13 to an output of an AC generation and isolation module 32 also located in the ground-based backhaul and power module 40. The voltage range used is a matter of convenience, current equipment practices and safety and regulatory considerations, 48 V DC being commonly used in telecommunications. Use of higher voltages would require more onerous safety precautions and may not be permitted at all in certain hazardous environments. An input of the AC generation and isolation module 32 is connected to a power supply unit 43 and a battery backup 44, both also located in the ground-based backhaul and power module 40. An input of the power supply unit 43 is connected to an AC mains supply. That is, a suitable AC power supply is generated at the bottom of the tower from a mains AC supply, with a battery back-up. It may be found preferable to generate a AC power supply at a frequency used in aircraft and military applications, for example around 360-440 Hz, to be able to use small, light transformers and generally available components. Although much higher frequencies, such as the 20 kHz frequency originally proposed by NASA for use in space applications, may be applicable, use of any frequencies significantly higher than mains 50/60 Hz, such as 360-440 Hz, have the aforesaid advantages in terms of the size and weight of the transformers.

Figure 2:
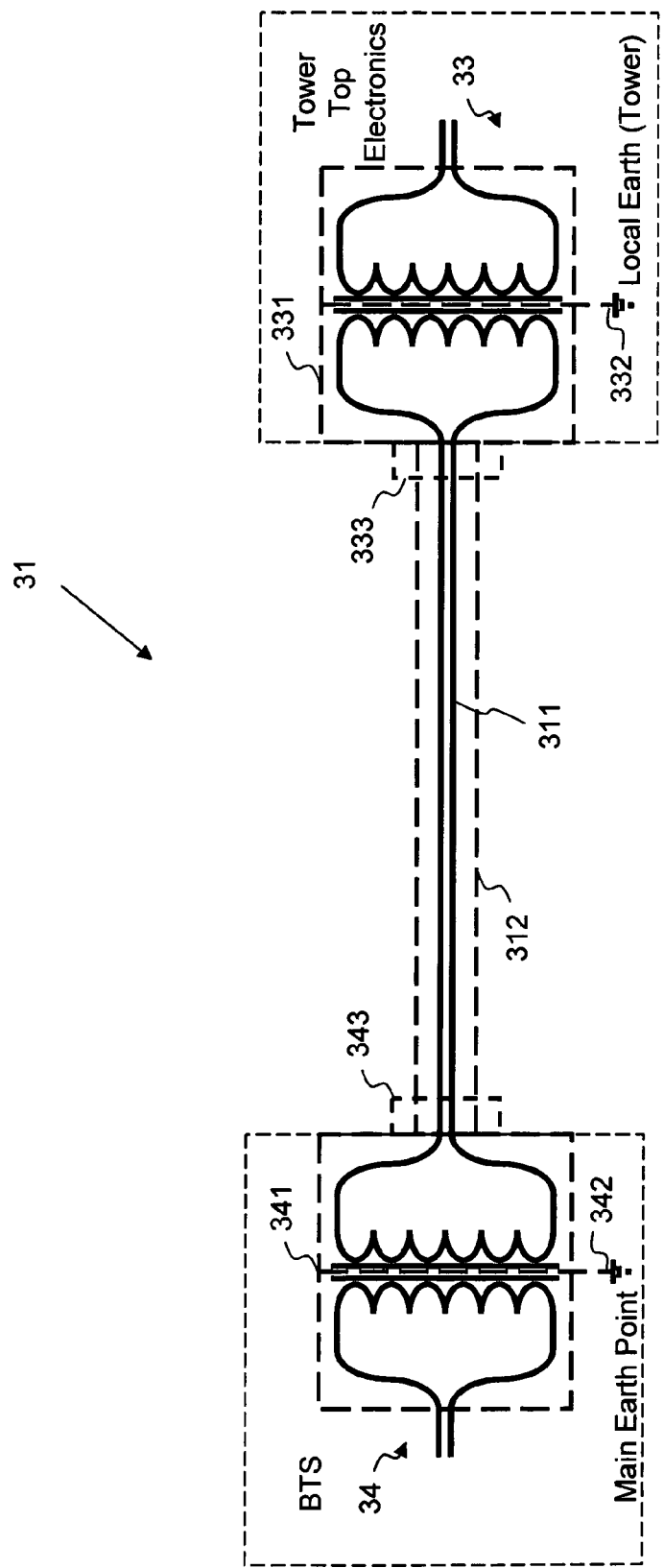
FIG. 2 is a diagram of an isolated balanced differential power distribution path of the power supply line of FIG. 1.

The isolated AC power distribution 31 is shown in more detail in FIG. 2. A grounded shielded twin conductor cable 311 connects a masthead isolation transformer 33, located in the masthead to power the tower-top electronics equipment, to a ground-based isolation transformer 34 in the backhaul and power module 40, located, for example, at the base of the tower. Alternatively, the twin-conductor cable may be shielded by a grounded conduit 312. Masthead electrostatic and overall shielding 331 for the masthead first isolation transformer 33, which extends between windings of the transformer, is connected to a local earth 332 at the top of the tower and ground-based electrostatic and overall shielding 341 for the ground-based isolation transformer 34, which extends between windings of the transformer, is connected to a main earth point 342 at the base of the tower. A masthead bulkhead connector 333 joins the twin-conductor cable shield 312 to the masthead electrostatic and overall shielding 331 and a ground-based bulkhead connector 343 joins the twin-conductor cable shield 312 to the ground-based electrostatic and overall shielding 341 to maintain an overall shield.

The transformer ratios are preferably close to 1:1. There are potential advantages in stepping up and down in voltages to reduce resistive losses but this is only worthwhile for extended distances, and also presents a potential safety issue.

Figure 3:
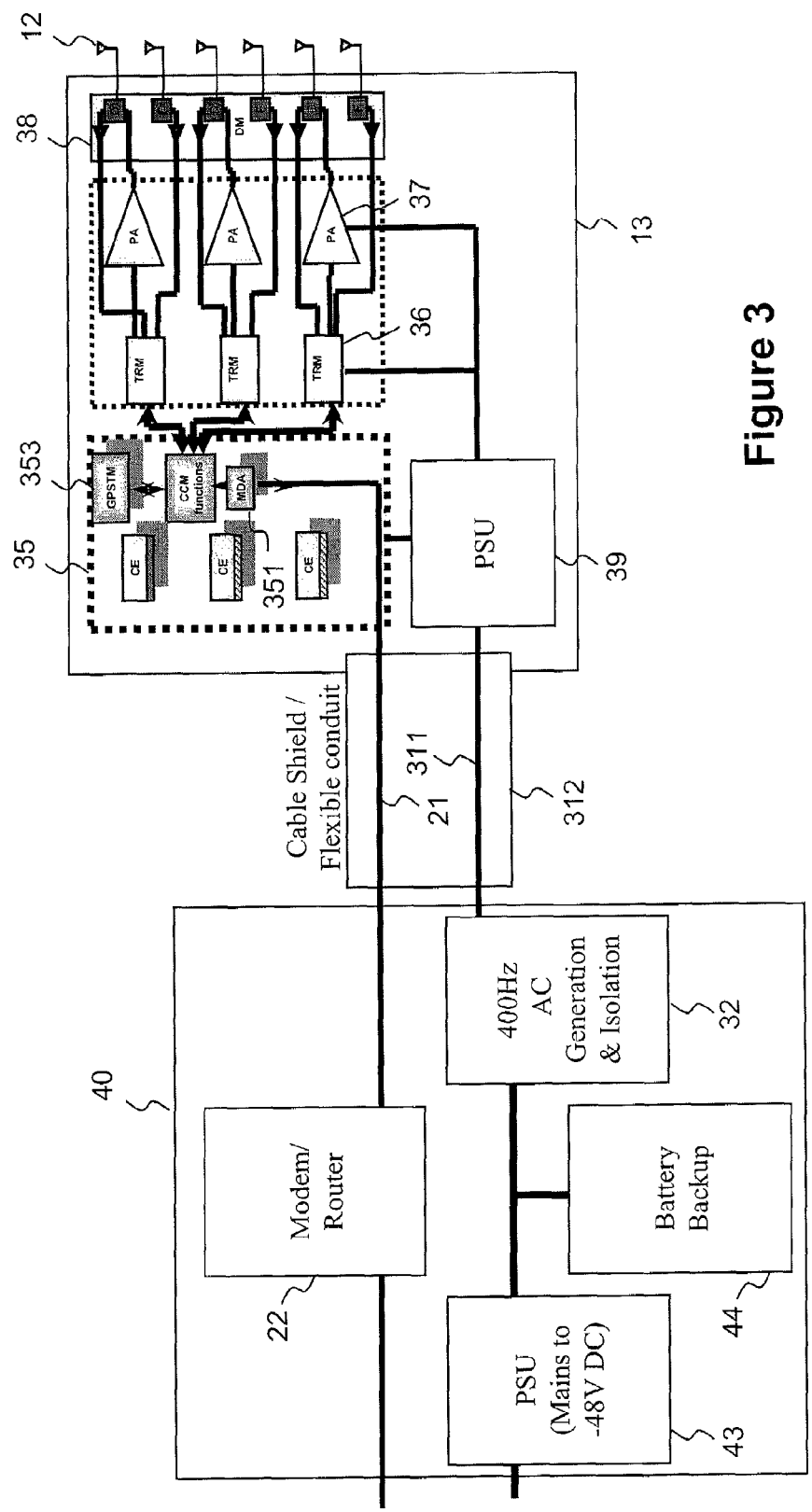
FIG. 3 is a schematic diagram of the power supply line of FIG. 1, showing in more detail masthead equipment powered by the power line.

FIG. 3 illustrates further details of the masthead basestation transceiver system 13, the details of the ground-based backhaul and power module 40 being the same as illustrated in FIG. 1. A masthead power supply unit 39 located in the basestation transceiver system 13 incorporating the masthead isolation transformer 33, not shown in FIG. 3, has an input from the twin conductor cable 311 and outputs to a network interface module 35, and three transmit/receive multiplexers 36 and three power amplifiers 37. As illustrated, the network interface module 35 includes a Media Dependent Adaptor (MDA) backhaul data transmission module 351 connected to the isolated data transmission connection 21. The MDA 351 is connected to a Control Command Module (CCM) functions module 352 which is also connected to a GPS timing module 353. The CCM functions module 352 has three ports connected to first, second and third transmit/receive multiplexers 36 respectively. Outputs from the respective transmit/receive multiplexers 36 are connected by three ports each to a diplexer module 38, one port of each transmit/receive multiplexer 36 being connected to the diplexer module 38 through first, second and third power amplifiers 37 respectively. The diplexer module 38 is connected to the masthead antennas 12. Thus all the masthead electronic components are powered through the isolated AC power distribution connection 31.

Although detailed descriptions of BTS equipment have been provided, it will be understood that the invention is not limited to the powering of cellular telephone masthead equipment and may be applied to, for example, masthead equipment other than cellular for other wireless access applications, or other remotely powered electronics equipment.

In the prior art, when lightning strikes a tower a large surge current flows through a finite impedance resulting from a combination of DC resistance and mutual self-inductance of the tower and associated cables. A current flow results in a voltage difference of 1,000s to 10,000s V between a top and a bottom of the tower. Any signal is therefore referenced to a changed earth potential.

With a balanced differential power supply, as used in the invention, a potential difference is provided on two parallel conductors and equipment is powered by the potential difference between the two conductors. This may be contrasted with an unbalanced, or single-ended, power supply in which, although two conductors may be provided, one of the conductors is earthed at both the power supply and the equipment terminals of the power supply line. The electronic equipment is then powered by a potential difference between the unearthed conductor and the local earth potential. This may cause lightning-induced surges if, because of a lightning strike, the local earth potential at a power supply terminal of the power supply line is different from the local earth potential at the equipment terminal of the power supply line.

With a balanced differential power transmission of the invention, such as the screened AC twin cable and isolation transformers described above, power transfer is balanced, therefore when a large voltage is induced on the power line, a same voltage is induced on both conductors. However, as the masthead electronic equipment is powered by a difference in voltage between the two conductors, the same additional induced voltage on both conductors does not affect operation of the equipment.

That is, the signal and the power supply input are not referenced at the top and bottom of the tower to local earths, so that a potential difference induced between the top and bottom by a lightning strike has no effect. The invention achieves effective isolation of power and data transmission and so removes local ground potential rise problems, as signals are not referenced to a local earth.

Moreover, the transformers will not magnetically couple common mode surge currents on supply conductors. The electrostatic shielding between windings reduces capacitive coupling of voltage surge on conductors. The overall shield provides a low-inductance bypass route for lightning current.

Although isolation transformers have been described as located at both the top and bottom of the tower, alternatively a single isolation transformer may be located selectively at or between the top or bottom of the tower.

The invention also has application to isolated (floating) DC power supply, using a single transformer within a conventional switched mode DC-DC converter to achieve isolation.

It will be understood that the invention is applicable to other remotely powered equipment, for example powered along the ground, where there is a risk of damage from a potential difference rise where lightning strikes at the power supply or at the powered equipment.

Although the present invention has been described with reference to preferred embodiments, workers skilled in the art will recognize that changes may be made in form and detail without departing from the spirit and scope of the invention.

We claim:

1. A power supply line for powering electronic equipment situated at a first location from a power supply situated at a second location remote from the electronic equipment, wherein the first location has a first local ground potential and the second location has a second local ground potential, the first location being sufficiently remote from the second location that a lightning surge current may induce a difference between the first local ground potential and the second local ground potential, the difference in potential being of a magnitude so as to risk causing damage if it were applied to the electronic equipment, the power supply line comprising a balanced differential power transmission path comprising two conductors connecting the power supply to the electronic equipment, the power supply being operable to provide a potential difference on each of the two conductors and the electronic equipment being operable to derive a potential difference between the two conductors, the power supply line further comprising at least one isolating transformer in the power supply line for providing isolation from the difference between the first and second local ground potentials associated with lightning surge currents, wherein the power supply line is not connected to the first or second local ground potential so as to achieve isolation from ground potential rise associated with lightning surge currents.

2. A power supply line as claimed in claim 1, wherein a first isolating transformer is located at a power supply terminal of the power transmission path and a second isolating transformer is provided at an electronic equipment terminal of the power transmission path.

3. A power supply line as claimed in claims 1 or 2, wherein the at least one isolating transformer has shielding extending between input and output windings of the transformer.

4. A power supply line as claimed in claim 1, wherein the balanced differential power transmission path comprises at least two cables for transmitting an alternating current.

5. A power supply line as claimed in claim 4, wherein the at least two cables are for transmitting an alternating current having a frequency of greater than common 50/60 Hz mains supplies.

6. A power supply as claimed in claim 5, wherein the at least two cables are for transmitting an alternating current having a frequency in the range 360 Hz to 440 Hz.

7. A power supply line as claimed in claim 1, for powering masthead electronic equipment of a wireless communications tower.

8. A power supply line as claimed in claim 7, wherein the wireless communications tower is further provided with an isolated data communications link to the masthead electronic equipment.

9. A power supply line as claimed in claim 8, wherein the isolated data communications link is at least one of an optical fibre link, a wireless link and an Ethernet link.

10. A power supply line as claimed in claim 1, adapted to operate at a sufficiently low voltage to allow safe installation in hazardous environments operate.

11. A power supply line as claimed in claim 1, comprising an isolated DC power supply, using a single transformer within a conventional switched mode DC-DC converter to achieve isolation.

12. A wireless communications tower comprising an isolated power supply line for powering masthead electronic equipment situated at a first location from a power supply situated at a second location remote from the electronic equipment, wherein the first location has a first local around potential and the second location has a second local around potential, the first location being sufficiently remote from the second location that a lightning surge current may induce a difference between the first local ground potential and the second local ground potential, the difference in potential being of a magnitude so as to risk causing damage if it were applied to the electronic equipment, the isolated power supply line comprising a balanced differential power transmission path comprising two conductors connecting the power supply to the electronic equipment, the power supply being operable to provide a potential difference on each of the two conductors and the electronic equipment being operable to derive a potential difference between the two conductors, the tower further comprising at least one isolating transformer in the power supply line for providing isolation from the difference between the first and second local ground potentials associated with lightning surge currents, wherein the isolated power supply line is not connected to the first or second local ground potential so as to achieve isolation from ground potential rise associated with lightning surge currents, and an isolated data communications link between the masthead electronic equipment and a network terminal.

13. A method of powering electronic equipment situated at a first location over an isolated power supply line from a power supply situated at a second location remote from the electronic equipment, wherein the first location has a first local ground potential and the second location has a second local around potential, the first location being sufficiently remote from the second location that a lightning surge current may induce a difference between the first local around potential and the second local around potential, the difference in potential being of a magnitude so as to risk causing damage if it were applied to the electronic equipment, the method being for providing isolation from the difference between the first and second local ground potentials associated with lightning surge currents, comprising the steps of:

a. providing a balanced differential power transmission path connecting the power supply to the electronic equipment, the path comprising two conductors;

b. providing at least one isolating transformer in the power supply line; and c. supplying power from the power supply to the electronic equipment through the balanced differential power transmission path and the at least one isolating transformer by providing, at the power supply, a potential difference on each of the two conductors and deriving, at the electronic equipment, a potential difference between the two conductors, wherein the isolated power supply line is not connected to the first or second a local ground potential so as to achieve isolation from ground potential rise associated with lightning surge currents.

14. A method as claimed in claim 13, wherein the step of providing at least one isolating transformer comprises the step of providing a first isolating transformer at a power supply terminal of the power transmission path and a second isolating transformer at an electronic equipment terminal of the power transmission path.

15. A method as claimed in claim 13, wherein the step of providing at least one isolating transformer comprises the step of providing at least one isolating transformer with shielding extending between input and output windings of the transformer.

16. A method as claimed in claim 13, wherein the step of providing a balanced differential power transmission path comprises providing at least two cables adapted for transmitting an alternating current.

17. A method as claimed in claim 16, wherein the step of providing at least two cables comprises providing at least two cables adapted for transmitting an alternating current having a frequency greater than common mains 50/60 Hz and the step of providing at least one isolating transformer comprises providing at least one isolating transformer for transmitting an alternating current having a frequency greater than common mains 50/60 Hz.

18. A method as claimed in claim 13, adapted for powering masthead electronic equipment of a wireless communications tower.

19. A method as claimed in claim 18, having a further step of providing the wireless communications tower with an isolated data communications link to the masthead electronic equipment.

20. A method as claimed in claim 19, wherein the step of providing the wireless communications tower with an isolated data communications link comprises providing at least one of an optical fibre link, a wireless link and an Ethernet link.

21. A method as claimed in claim 13, adapted to operate at a sufficiently low voltage to allow safe installation in hazardous environments.

22. A method as claimed in claim 13, wherein the step of providing a balanced differential power transmission path comprises providing an isolated DC power supply; and the step of providing at least one isolating transformer in the power supply line comprises providing a single transformer within a switched mode DC-DC converter to achieve isolation.

* * * * *